US012647235B2

(12) United States Patent
Li et al.

(10) Patent No.: US 12,647,235 B2
(45) Date of Patent: Jun. 2, 2026

(54) METHODS AND APPARATUS FOR CONTROL RESOURCE SET (CORESET) CONFIGURATION

(71) Applicant: LENOVO (BEIJING) LIMITED, Beijing (CN)

(72) Inventors: Yingying Li, Beijing (CN); Yuantao Zhang, Beijing (CN); Zhi Yan, Beijing (CN); Hongmei Liu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 398 days.

(21) Appl. No.: 18/249,185

(22) PCT Filed: Oct. 16, 2020

(86) PCT No.: PCT/CN2020/121492
§ 371 (c)(1),
(2) Date: Apr. 14, 2023

(87) PCT Pub. No.: WO2022/077440
PCT Pub. Date: Apr. 21, 2022

(65) Prior Publication Data
US 2023/0403120 A1     Dec. 14, 2023

(51) Int. Cl.
*H04L 5/00* (2006.01)

(52) U.S. Cl.
CPC .......... *H04L 5/0053* (2013.01); *H04L 5/0094* (2013.01)

(58) Field of Classification Search
CPC ........................... H04L 5/0053; H04L 5/0094
See application file for complete search history.

(56) References Cited

U.S. PATENT DOCUMENTS

| | | | | | |
|---|---|---|---|---|---|
| 2019/0140776 A1* | 5/2019 | Seo | ...................... | H04B 7/0456 |
| 2020/0229154 A1* | 7/2020 | Takeda | ..................... | H04L 27/26 |
| 2021/0084590 A1* | 3/2021 | Nam | ................. | H04W 52/0216 |
| 2021/0099898 A1* | 4/2021 | You | ....................... | H04W 24/08 |
| 2023/0155799 A1* | 5/2023 | Shin | ..................... | H04J 11/0073 |

FOREIGN PATENT DOCUMENTS

EP          3678317 A1      7/2020

OTHER PUBLICATIONS

International Search Report and Written Opinion dated Jul. 6, 2021 for International Application No. PCT/CN2020/121492.
Huawei et al. "Overview of PDCCH-CCE-REG mapping and REG bundling" 3GPP TSG RAN WG1 NR Ad-Hoc#2 R1-1710011; Jun. 30, 2017; pp. 1-7.
Nokia et al. "On the PDCCH construction for NR" 3GPP TSG RAN WG1 NR Ad-Hoc#2 R1-1710978; Jun. 30, 2017; pp. 1-5.

* cited by examiner

*Primary Examiner* — Ronald B Abelson
(74) *Attorney, Agent, or Firm* — AMPACC Law Group, PLLC

(57)          ABSTRACT
Embodiments of the present disclosure relate to methods and apparatus for control resource set (CORESET) configuration. According to an embodiment of the present disclosure, a method may include: receiving a configuration of a CORESET, wherein the CORESET includes a set of resource units (RUs), and the configuration indicates at least one of a time duration of the CORESET, a pattern of the set of RUs, or an RU size; and determining the set of RUs of the CORESET based at least in part on the at least one of the time duration, the pattern, or the RU size.

20 Claims, 9 Drawing Sheets

REG bundle 0

REG bundle 1

REG bundle 2

REG bundle 3

FIG. 3

METHODS AND APPARATUS FOR CONTROL RESOURCE SET (CORESET) CONFIGURATION

CROSS REFERENCE TO RELATED APPLICATIONS

This application is a national phase entry of International Application No. PCT/CN2020/121492 filed Oct. 16, 2020, which is incorporated by reference in its entirety.

TECHNICAL FIELD

Embodiments of the present disclosure are related to wireless communication technologies, and more particularly, related to methods and apparatuses for control resource set (CORESET) configuration.

BACKGROUND

In some 3rd Generation Partnership Project (3GPP) new radio (NR) scenarios, a CORESET structure with a longer size/duration (e.g., 4~6 symbols) may be introduced to enhance physical downlink control channel (PDCCH) reliability or coverage by introducing a larger aggregation level or more resources for PDCCH transmission with a small bandwidth part (BWP), e.g., 20 MHz in FR1 band (450 MHz-6 GHz), or 50 MHz or 100 MHz in FR2 band (24.25 GHz-52.6 GHz), for a reduced capability (RedCap) user equipment (UE). The legacy mapping rule for a CORESET structure with 1~3 symbols may not work well for the longer duration CORESET especially in the coexistence of RedCap UEs and legacy UEs (with regular resource allocation). Thus, an enhanced mapping rule for the longer duration CORESET is needed.

SUMMARY OF THE DISCLOSURE

According to some embodiments of the present disclosure, a method may include: receiving a configuration of a CORESET, wherein the CORESET includes a set of resource units (RUs), and the configuration indicates at least one of a time duration of the CORESET, a pattern of the set of RUs, or an RU size; and determining the set of RUs of the CORESET based at least in part on the at least one of the time duration, the pattern, or the RU size.

In an embodiment of the present disclosure, the configuration of the CORESET may include the pattern of the set of RUs when the time duration of the CORESET is larger than 3 symbols, and the pattern is selected from a predefined pattern set.

In an embodiment of the present disclosure, the configuration of the CORESET may include the time duration of the CORESET, which equals a sum of symbols of the set of RUs based on the pattern of the set of RUs. In another embodiment of the present disclosure, the configuration may implicitly indicate the time duration, which can be determined by a sum of symbols of the set of RUs based on the pattern. Additionally, the configuration may include a duration equal to a size of a first RU in the set of RUs.

In an embodiment of the present disclosure, the configuration of the CORESET may include a parameter, and a value of the parameter indicates both the time duration of the CORESET and the pattern of the set of RUs.

In an embodiment of the present disclosure, the configuration of the CORESET may include a size of each RU in the set of RUs.

In an embodiment of the present disclosure, the configuration of the CORESET may include the time duration of the CORESET and the RU size, and determining the set of RUs may include determining the pattern of the set of RUs based on the time duration and the RU size. For example, determining the pattern of the set of RUs based on the time duration and the RU size may include determining that all but a last RU of the set of RUs have a size equal to the RU size, and the last RU has a size less than or equal to 3 symbols in time domain.

In an embodiment of the present disclosure, the configuration of the CORESET may include the time duration of the CORESET, and determining the set of RUs may include determining the pattern of the set of RUs based on the time duration.

In an embodiment of the present disclosure, the configuration of the CORESET may further include a resource element group (REG) bundle size for each RU of the set of RUs. The REG bundle size for each RU can be a common REG bundle size selected from an intersection of REG bundle size candidates of all the set of RUs. The method may further include determining a control-channel element (CCE)-to-REG mapping defined in the whole CORESET based at least on the common REG bundle size and a total number of REGs in the CORESET. Alternatively, a first REG bundle size can be indicated for a first RU of the set of RUs, and a second REG bundle size can be indicated for a second RU of the set of RUs. The method may further include: determining a first CCE-to-REG mapping defined within the first RU based at least on the first REG bundle size and a first total number of REGs in the first RU; and determining a second CCE-to-REG mapping defined within the second RU based at least on the second REG bundle size and a second total number of REGs in the second RU. In an embodiment of the present disclosure, the configuration may further indicate a first interleaver size for the first RU and a second interleaver size for the second RU.

According to some embodiments of the present disclosure, a method may include: transmitting a configuration of a CORESET, wherein the CORESET includes a set of RUs, and the configuration indicates at least one of a time duration of the CORESET, a pattern of the set of RUs, or an RU size.

In an embodiment of the present disclosure, the configuration of the CORESET may include the pattern of the set of RUs when the time duration of the CORESET is larger than 3 symbols, and the pattern is selected from a predefined pattern set.

In an embodiment of the present disclosure, the configuration of the CORESET may include the time duration of the CORESET, which equals a sum of symbols of the set of RUs based on the pattern of the set of RUs. In another embodiment of the present disclosure, the configuration may implicitly indicate the time duration, which can be determined by a sum of symbols of the set of RUs based on the pattern. Additionally, the configuration may include a duration equal to a size of a first RU in the set of RUs.

In an embodiment of the present disclosure, the configuration of the CORESET may include a parameter, and a value of the parameter indicates both the time duration of the CORESET and the pattern of the set of RUs.

In an embodiment of the present disclosure, the configuration of the CORESET may include a size of each RU in the set of RUs.

In an embodiment of the present disclosure, the configuration of the CORESET may include the time duration of the CORESET and the RU size, and wherein all but a last RU of the set of RUs have a size equal to the RU size, and the last RU has a size less than or equal to 3 symbols in time domain.

In an embodiment of the present disclosure, the configuration of the CORESET may include the time duration of the CORESET, and the time duration corresponds to a predefined pattern of the set of RUs.

In an embodiment of the present disclosure, the configuration of the CORESET may further include an REG bundle size for each RU of the set of RUs. The REG bundle size for each RU can be a common REG bundle size selected from an intersection of REG bundle size candidates of all the set of RUs. The method may further include performing a CCE-to-REG mapping in the whole CORESET based at least on the common REG bundle size and a total number of REGs in the CORESET. Alternatively, a first REG bundle size can be indicated for a first RU of the set of RUs, and a second REG bundle size can be indicated for a second RU of the set of RUs. The method may further include: performing a first CCE-to-REG mapping within the first RU based at least on the first REG bundle size and a first total number of REGs in the first RU; and performing a second CCE-to-REG mapping within the second RU based at least on the second REG bundle size and a second total number of REGs in the second RU. In an embodiment of the present disclosure, the configuration may further indicate a first interleaver size for the first RU and a second interleaver size for the second RU.

According to other embodiments of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

FIG. 3 illustrates an exemplary irregular resource allocation caused by applying the legacy mapping rule to a 5-symbol CORESET;

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect or limit the principle and spirit of the present disclosure.

Figure 1:
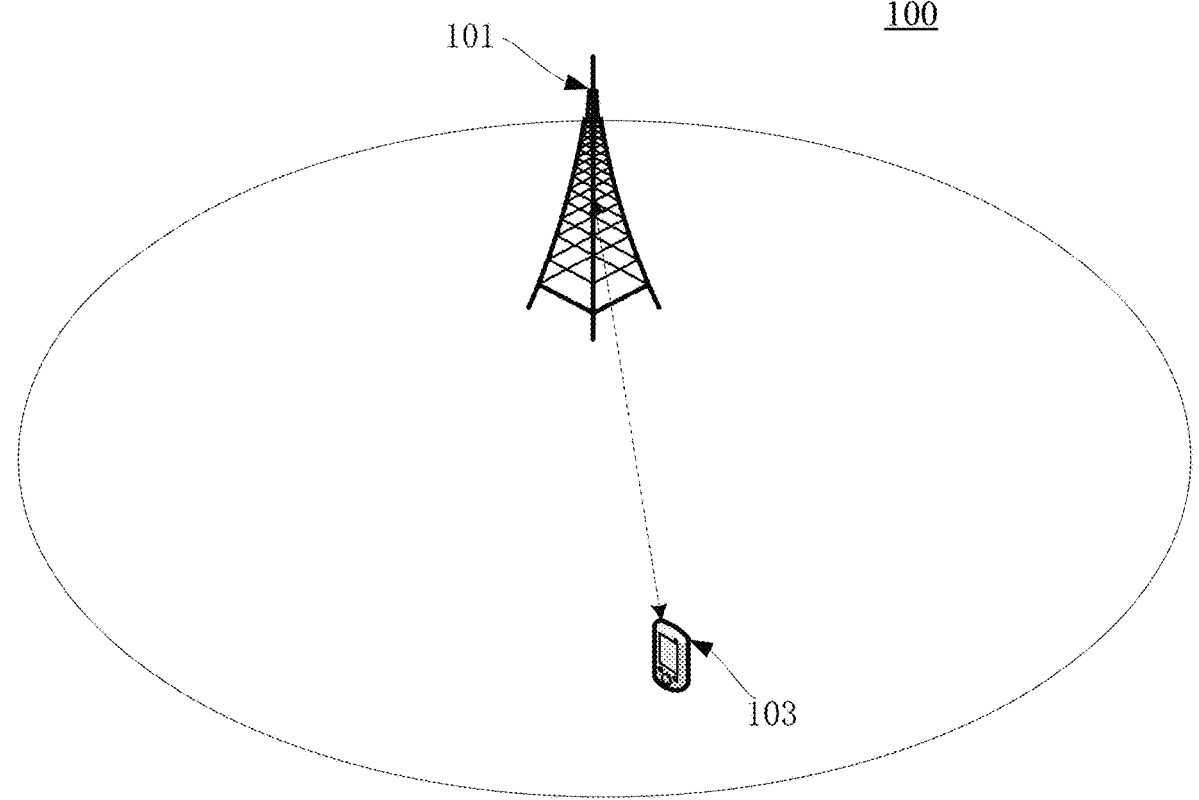
FIG. 1 illustrates a schematic diagram of an exemplary wireless communication system according to some embodiments of the present disclosure.

FIG. 1 illustrates a schematic diagram of an exemplary wireless communication system 100 according to some embodiments of the present disclosure.

As shown in FIG. 1, the wireless communication system 100 can include at least one base station (BS) 101 and at least one UE 103. Although a specific number of BSs 101 and UEs 103, e.g., only one BS 101 and one UE 103, are depicted in FIG. 1, one skilled in the art will recognize that any number of BSs 101 and UEs 103 may be included in the wireless communication system 100.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks. The BS 101 and the UE 103 may support communication based on, for example, 3G, LTE, LTE-advanced (LTE-A), NR, or other suitable protocol(s).

The BS 101 may be distributed over a geographic region, and generally be a part of a radio access network that may include one or more controllers communicably coupled to one or more corresponding BSs 101. In some embodiments of the present disclosure, the BS 101 may also be referred to as an access point, an access terminal, a base, a macro cell, a Node-B, an evolved Node B (eNB), a gNB, a Home Node-B, a relay node, a device, or described using other terminology used in the art.

According to some embodiments of the present disclosure, the UE 103 may be or include a computing device, such as a desktop computer, a laptop computer, a personal digital assistant (PDA), a tablet computer, a smart television (e.g., a television connected to the Internet), a set-top box, a game console, a security system (including a security camera), a vehicle on-board computer, a network device (e.g., a router, a switch, or a modem), or the like. According to some other embodiments of the present disclosure, the UE 103 may be or include a portable wireless communication device, a smart phone, a cellular telephone, a flip phone, a device having a subscriber identity module, a personal computer, a selective call receiver, or any other device that is capable of sending and receiving communication signals on a wireless network. In addition, the UE 103 may also be referred to as a subscriber unit, a mobile, a mobile station, a user, a terminal, a mobile terminal, a wireless terminal, a fixed terminal, a subscriber station, a user terminal, or a device, or described using other terminology used in the art.

According to some other embodiments of the present disclosure, the UE 103 may be a RedCap UE. The UEs in the wireless communication system 100 can be various devices. For example, both RedCap UE(s) and legacy UE(s) can be included in the wireless communication system 100.

The BS 101 may transmit a physical downlink control channel (PDCCH) consisting of one or more control-channel elements (CCEs) to the UE 103. The number of CCEs in a PDCCH corresponds to a PDCCH aggregation level. A CCE consists of 6 resource element groups (REGs), where an REG equals one resource block in frequency domain during one symbol (e.g., OFDM symbol) in time domain.

The UE 103 can be configured with one or more control resource sets (CORESETs) for each bandwidth part (BWP). A CORESET consists of $$N_{RB}^{CORESET}$$

resource blocks in the frequency domain and $$N_{symb}^{CORESET}$$

symbols in the time domain (also referred to as a time duration of the CORESET). REGs within a CORESET can be numbered in an increasing order in a time-first frequency-second manner, starting with 0 for the first symbol and the lowest-numbered resource block in the CORESET.

For each CORESET, CCEs can be mapped to the REGs in the CORESET based on a mapping rule. According to the legacy mapping rule for a CORESET structure with 1~3 symbols in the time domain, each CORESET is associated with only one CCE-to-REG mapping. The CCE-to-REG mapping for a CORESET can be interleaved or non-interleaved and is described by REG bundles:

REG bundle i consists of REGs {iL, iL+1, . . . , iL+L−1}, where L is the REG bundle size, $$i = 0, 1, \ldots, N_{REG}^{CORESET}/L - 1, \text{ and } N_{REG}^{CORESET} = N_{RB}^{CORESET} N_{symb}^{CORESET}$$

is the number of REGs in the CORESET.

CCE j consists of REG bundles {f(6j/L), f(6j/L+1), . . . , f(6j/L+6/L−1)}, where f(•) is an interleaver.

For non-interleaved CCE-to-REG mapping, L=6 and f(x) =x.

For interleaved CCE-to-REG mapping, L∈{2,6} for $$N_{symb}^{CORESET} = 1 \text{ and } L \in \left\{ N_{symb}^{CORESET}, 6 \right\} \text{ for } N_{symb}^{CORESET} \in \{2, 3\}.$$

The interleaver is defined by:

$$f(x) = (rC + c + n_{shift}) \bmod \left( N_{REG}^{CORESET}/L \right)$$

$$x = cR + r$$

$$r = 0, 1, \ldots, R-1$$

$$c = 0, 1, \ldots, C-1$$

$$C = N_{REG}^{CORESET}/(LR)$$

where R is an interleaver size and can be configured to be, for example, 2, 3, or 6, and $n_{shift}$ is a shift value configured by higher layer.

Figure 2A:
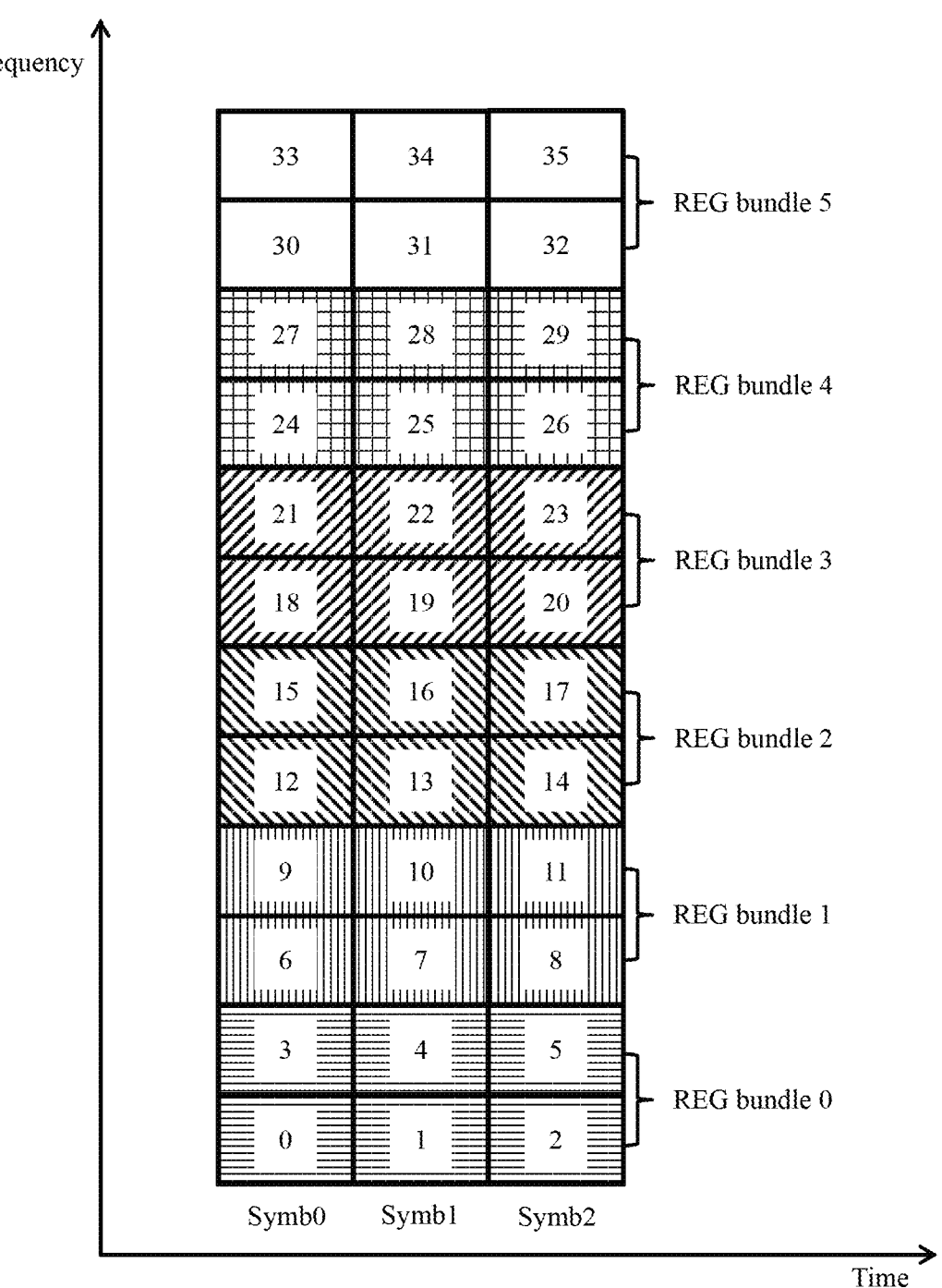
FIG. 2A illustrates an exemplary non-interleaved CCE-to-REG mapping for a 3-symbol CORESET.

FIG. 2A illustrates an exemplary non-interleaved CCE-to-REG mapping for a 3-symbol (Symb0~Symb2) CORESET. In this example, $$N_{RB}^{CORESET} = 12, N_{symb}^{CORESET} = 3, \text{ and } L = 6.$$

According to the above mapping rule, CCE 0 consists of REG bundle 0 consisting of REGs 0~5, CCE 1 consists of REG bundle 1 consisting of REGs 6~11, and so on.

Figure 2B:
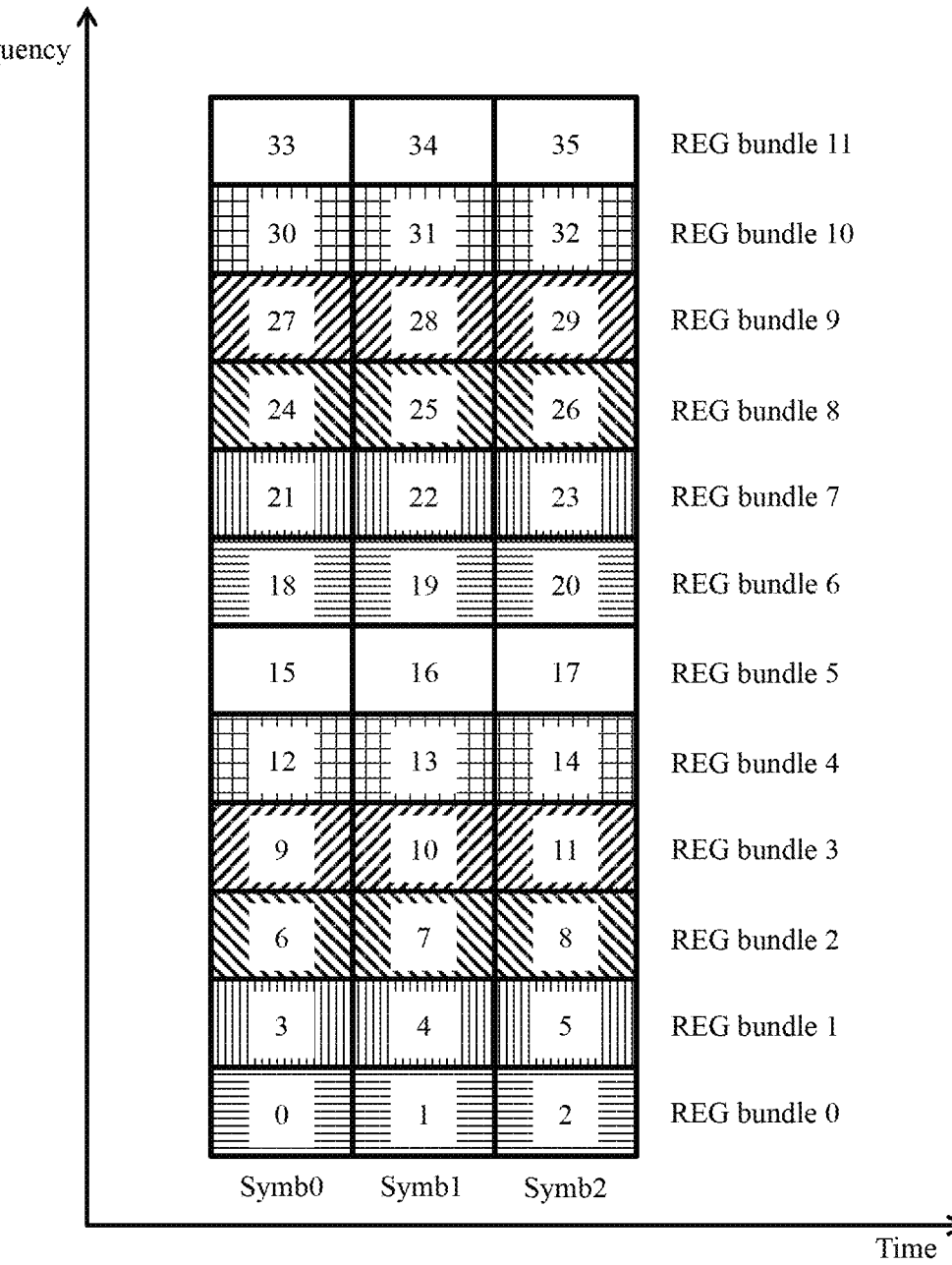
FIG. 2B illustrates an exemplary interleaved CCE-to-REG mapping for a 3-symbol CORESET.

FIG. 2B illustrates an exemplary interleaved CCE-to-REG mapping for a 3-symbol (Symb0~Symb2) CORESET. In this example, $$N_{RB}^{CORESET} = 12, N_{symb}^{CORESET} = 3, \text{ and } L = N_{symb}^{CORESET} = 3.$$

According to the above mapping rule, CCE 0 may consist of REG bundle 0 consisting of REGs 0~2 and REG bundle 6 consisting of REGs 18~20, CCE 1 may consist of REG bundle 1 consisting of REGs 3~5 and REG bundle 7 consisting of REGs 21~23, and so on.

Figure 3:
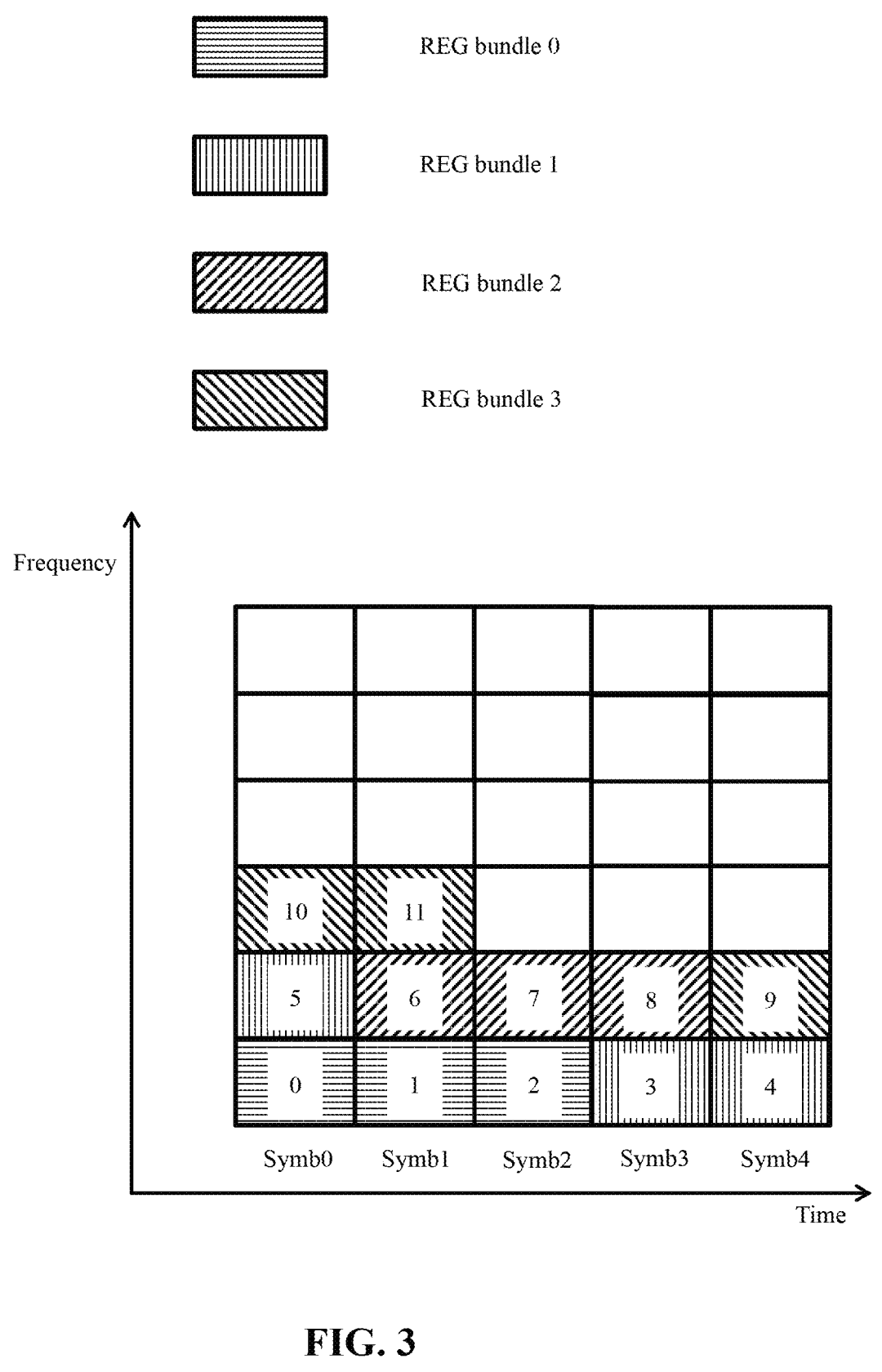

When the legacy mapping rule is applied to longer duration CORESETs (e.g., configured for a RedCap UE), irregular resource allocation may be caused. FIG. 3 illustrates an exemplary irregular resource allocation caused by applying the legacy mapping rule to a 5-symbol (Symb0~Symb4) CORESET. For purpose of simplicity, FIG. 3 only illustrates REG bundles constituting two CCEs. For example, CCE 0 may consist of REG bundle 0 consisting of REGs 0~2 and REG bundle 1 consisting of REGs 3~5, and CCE 1 may consist of REG bundle 2 consisting of REGs 6~8 and REG bundle 3 consisting of REGs 9~11. It can be seen that both CCE 0 and CCE 1 may include resource blocks in an irregular shape.

Such irregular resource allocation may be problematic especially when RedCap UEs and legacy UEs coexist in a network. For example, a legacy UE with regular resource allocation cannot use the irregular-shaped resource blocks when they are not used by a RedCap UE, and thus these resource blocks have to be discarded, which may result in a waste of resources. In addition, when a demodulation reference signal (DMRS) in an REG bundle is used for channel estimation, it is assumed that the same precoding is used within the REG bundle. However, an REG bundle in the irregular resource allocation may include separated REGs. For example, as shown in FIG. 3, in REG bundle 1, REGs 3 and 4 are in Symb3 and Symb4 while REG 5 is in Symb0. The above assumption may be less accurate for such a REG bundle. As a result, the performance of channel estimation may be degraded and PDCCH demodulation may be adversely affected.

As will specifically described below, the present disclosure provides at least enhanced mapping rules (e.g., configuration for REG bundle size, CCE-to-REG mapping, interleaver size, etc.) for the longer duration CORESET. Although embodiments of the present disclosure may be described with respect to a CORESET with a specific $$N_{RB}^{CORESET}$$

or a specific $$N_{symb}^{CORESET},$$

it is contemplated that a CORESET with a different $$N_{RB}^{CORESET} \text{ or } N_{symb}^{CORESET}$$

can be applied without departing from the principle and spirit of the present disclosure.

According to some embodiments of the present disclosure, a CORESET with a time duration larger than 3 symbols can be divided into one or more resource units (RUs) in the time domain. The size of each RU can be 1, 2, or 3 symbols, which is compatible with the legacy CORESET duration. In some embodiments of the present disclosure, the size of an RU can equal the time duration of the CORESET. For example, for a 6-symbol CORESET, the size of the RU(s) in the CORESET can be selected from {1, 2, 3, 6}. Each RU with a size selected from {1, 2, 3} will be like a legacy CORESET and a CCE-to-REG mapping can work as legacy within the RU. An RU with a size of 6 symbols will not be like a legacy CORESET, but it will not cause the problem of irregular resource allocation because the number 6 is an integral multiple of the legacy CORESET duration (i.e., 1, 2 or 3).

Division of the RU(s) in a CORESET can have various patterns. The pattern may specify a size of each RU in the CORESET. Candidates of RU patterns for some exemplary CORESET configurations may include but not be limited to the followings:

For a 4-symbol CORESET: '2+2', '3+1', or '1+3'.
For a 5-symbol CORESET: '2+3' or '3+2'.
For a 6-symbol CORESET: '3+3', '6', or '2+2+2'.

Figure 4:
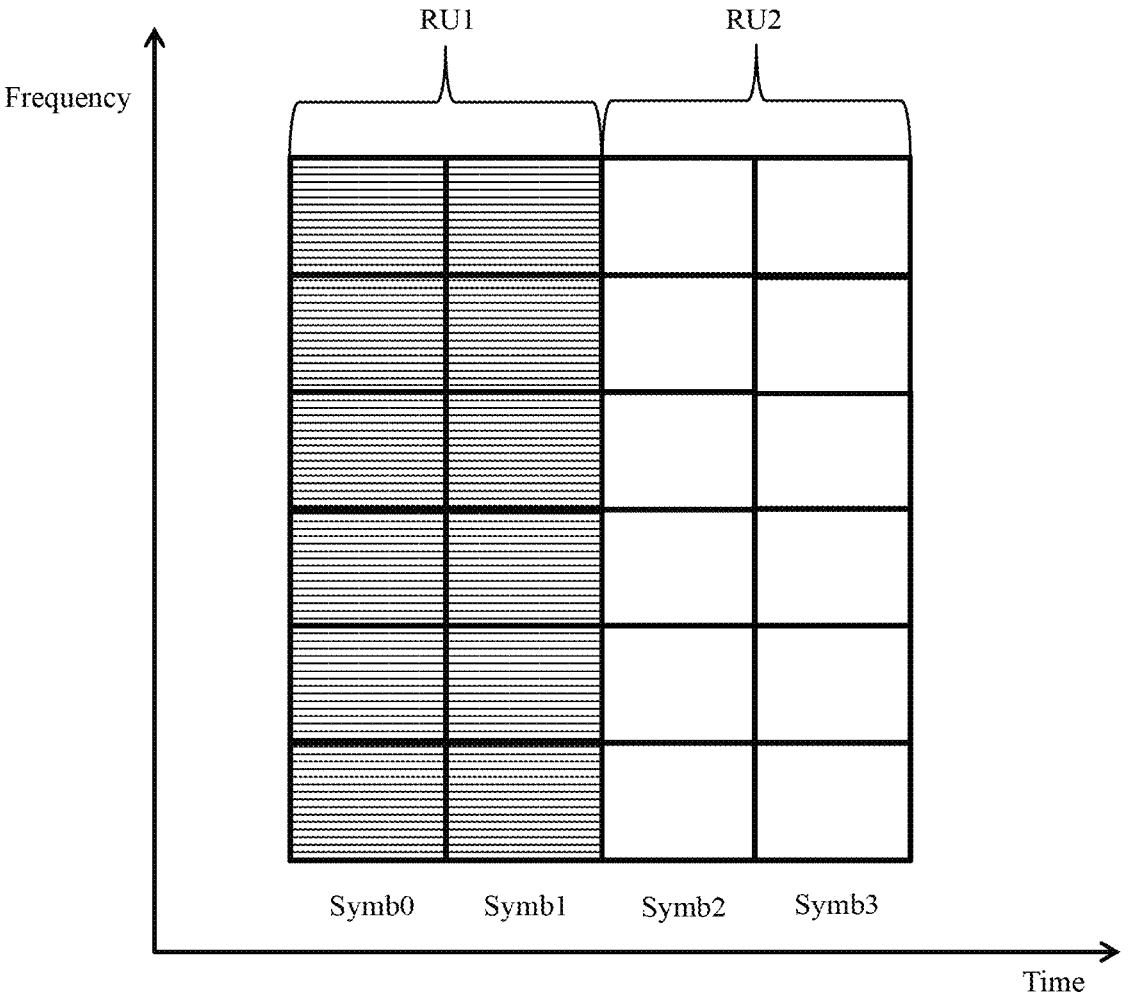
FIG. 4 illustrates an exemplary 4-symbol CORESET divided into 2 RUs according to some embodiments of the present disclosure.

According to the above, for example, a 4-symbol CORESET can be divided into a first RU with a size of 2 symbols and a second RU with a size of 2 symbols (represented by the pattern '2+2'), or a first RU with a size of 3 symbols and a second RU with a size of 1 symbol (represented by the pattern '3+1'), or a first RU with a size of 1 symbol and a second RU with a size of 3 symbols (represented by the pattern '1+3'). FIG. 4 illustrates an exemplary 4-symbol (Symb0~Symb3) CORESET divided into 2 RUs (RU1 and RU2) with the pattern '2+2' according to some embodiments of the present disclosure.

According to some embodiments of the present disclosure, a BS (e.g., the BS 101 in FIG. 1) may configure the division of RU(s) in a CORESET for a UE (e.g., the UE 103 in FIG. 1) via a higher layer signaling, e.g., radio resource control (RRC) signaling. The configuration may indicate at least one of a time duration of the CORESET, a pattern of the RU(s), or an RU size. The UE can determine the configured division of RU(s) based at least in part on the at least one of the time duration, the pattern, or the RU size indicated by the configuration.

According to some embodiments of the present disclosure, the BS may configure the time duration of the CORESET and the pattern of the RU(s) by separate parameters or steps. For example, the time duration of the CORESET can be configured by the legacy parameter 'duration' in the information element (IE) 'ControlResourceSet,' which represents the number of symbols in the CORESET. The maximum value of the parameter 'duration' can be extended from 3 to a larger number (e.g., 6) such that it can be used for a longer duration CORESET as well as a CORESET with a legacy time duration (i.e., 1~3 symbols). A new parameter (e.g., 'DivisionPattern') can be introduced to configure the pattern of the RU(s) in the CORESET. In some embodiments of the present disclosure, the new parameter is a conditional parameter. It is configured only when the time duration of the CORESET is larger than 3 symbols because a CORESET with a time duration less than or equal to 3 symbols need not be divided into RU(s).

The pattern of the RU(s) can be selected from a predefined pattern set. This can be implemented by defining the new parameter as a choice among a set of possible division patterns. In addition, a restriction should be applied to the choice that a sum of symbols of the divided RU(s) based on the chosen pattern should equal the configured time duration of the CORESET.

As an example, the new parameter may be defined as:
DivisionPattern CHOICE {2+2, 3+1, 1+3, 3+2, 2+3, 3+3, 6, 2+2+2}

When the time duration of the CORESET is configured as 4 symbols, 'DivisionPattern' can be configured as '2+2', '3+1' or '1+3'. When the time duration of the CORESET is configured as 5 symbols, 'DivisionPattern' can be configured as '3+2' or '2+3'. When the time duration of the CORESET is configured as 6 symbols, 'DivisionPattern' can be configured as '3+3', '6' or '2+2+2'.

As another example, the new parameter may be defined as follows, which incorporates the aforementioned restriction in the definition of the parameter:

```
DivisionPattern    CHOICE {
    4 symbols          ENUMERATED {2+2, 3+1, 1+3},
    5 symbols          ENUMERATED {3+2, 2+3},
    6 symbols          ENUMERATED {3+3, 6, 2+2+2},
}
```

In an embodiment of the present disclosure, each pattern in the predefined pattern set may correspond to a respective value of the parameter 'DivisionPattern.' For example, the pattern '2+2' may correspond to a value '0', the pattern '3+1' may correspond to a value '1', and so on. When the pattern '2+2' is chosen, the BS may configure the value of the parameter 'DivisionPattern' as '0'. When the pattern '3+1' is chosen, the BS may configure the value of the parameter 'DivisionPattern' as '1'.

According to some embodiments of the present disclosure, the BS may configure both the time duration of the CORESET and the pattern of the RU(s) by a single parameter.

In an embodiment of the present disclosure, the legacy parameter 'duration' in the IE 'ControlResourceSet' is not changed (i.e., its maximum value is 3) and can be used to configure the time duration of the CORESET that is less than or equal to 3 symbols, for example, when the UE does not support the longer duration CORESET or the UE fallbacks to legacy capability. For a longer duration CORESET, a new parameter (e.g., 'DivisionPattern') can be introduced to configure both the time duration of the CORESET and the pattern of the RU(s). That is, the new parameter is a conditional parameter. It is configured only when the time duration of the CORESET is larger than 3 symbols because a CORESET with a time duration less than or equal to 3 symbols need not be divided into RU(s).

As an example, the new parameter may indicate the pattern of the RU(s) in the CORESET, which may, for example, be selected from a predefined pattern set in a similar way as described above. The time duration of the CORESET can be determined by a sum of symbols of the divided RU(s) based on the chosen pattern. That is, the new parameter indicating the pattern of the RU(s) can implicitly indicate the time duration of the CORESET. The parameter 'duration' can be simply ignored when the new parameter is present. Alternatively, a restriction may be applied that the size of the first RU in the CORESET should equal the value of the parameter 'duration' when the new parameter is present.

In another embodiment of the present disclosure, the legacy parameter 'duration' may be extended to be used for configuring both the time duration of the CORESET and the pattern of the RU(s). For example, the parameter 'duration' can be defined as follows: when the parameter has a value '1', '2', or '3', the value represents the time duration of the CORESET in number of symbols; when the parameter has a value larger than 3, the value represents a corresponding combination of a predefined time duration of the CORESET and a predefined pattern of the RU(s). The following Table 1 shows a non-limiting example of the extended definition of the parameter 'duration'. In this example, a value '4' of the parameter 'duration' may configure a CORESET with a time duration of 4 symbols and a RU pattern '2+2'.

TABLE 1

| Example of extended definition of 'duration' duration INTEGER (1 . . . 8) | |
| --- | --- |
| Value | Description |
| 1/2/3 | contiguous time duration of the CORESET in number of symbols |
| 4 | Duration = 4; pattern is '2 + 2' |
| 5 | Duration = 5; pattern is '3 + 2' |
| 6 | Duration = 5; pattern is '2 + 3' |
| 7 | Duration = 6; pattern is '3 + 3' |
| 8 | Duration = 6; pattern is '6' |

According to some embodiments of the present disclosure, the BS may configure a size of each RU in the CORESET instead of a pattern of the RU(s). In an embodiment of the present disclosure, the legacy parameter 'duration' (with a maximum value of 3) can be used to configure the size for the first RU, and sizes for other RU(s) can be configured by new parameter(s), where each parameter indicates a size for a corresponding RU.

Configuring a respective size for each RU in the CORESET may increase the overhead of signaling. According to some embodiments of the present disclosure, the BS may configure the time duration of the CORESET and an RU size to implicitly indicate the pattern of the RU(s). For example, the time duration of the CORESET can be configured by the legacy parameter 'duration' in the IE 'ControlResourceSet,' and the maximum value of the parameter 'duration' can be extended from 3 to a larger number (e.g., 6). A new parameter (e.g., 'ResourceUnitSize') can be introduced to configure the RU size, which may, for example, be 1, 2, or 3 symbols in the time domain. The pattern of the RU(s) can be determined based on the configured time duration and RU size.

Figure 5A:
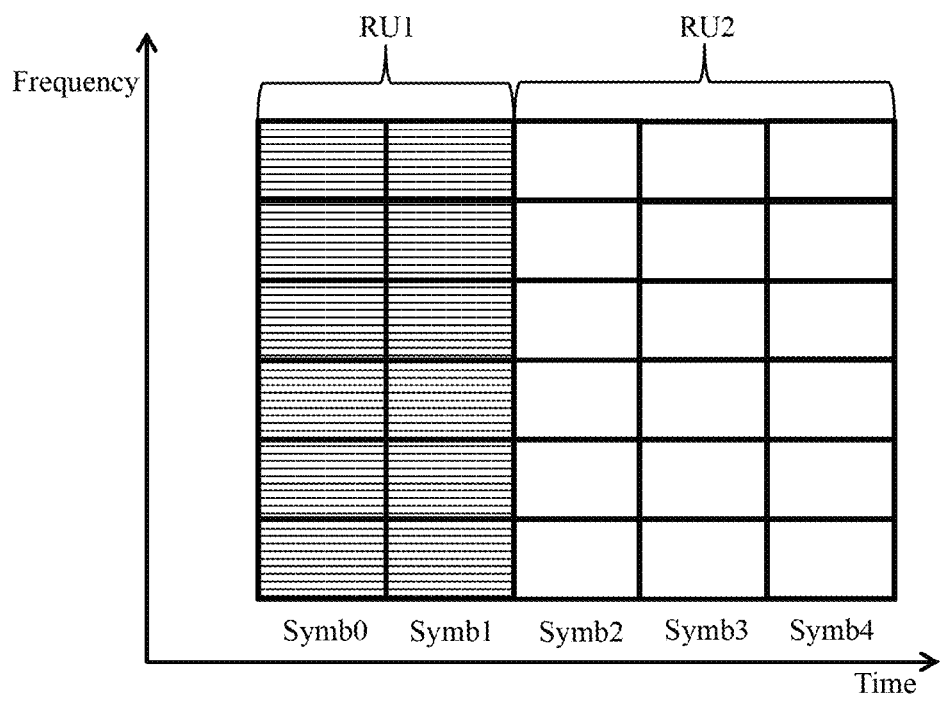
FIG. 5A illustrates an exemplary RU division for a 5-symbol CORESET according to an embodiment of the present disclosure.

In an embodiment of the present disclosure, RU(s) with the configured RU size can be determined consecutively from the first symbol in the CORESET until the left number of symbols is less than or equal to 3. The last RU in the CORESET is determined to have a size equal to the left number of symbols. That is, all but the last RU in the CORESET have a size equal to the configured RU size, and the last RU has a size less than or equal to 3 symbols in the time domain. The size of the last RU may be larger than the configured RU size. FIG. 5A illustrates an exemplary RU division for a 5-symbol CORESET according to the embodiment. In this example, the RU size is configured to be 2 symbols in the time domain. First, RU1 with a size of 2 symbols is determined to consist of Symb0 and Symb1. After RU1 is determined, the left number of symbols in the CORESET equals 3. Thus, all these left symbols (Symb2~Symb4) are determined to be RU2, which has a size of 3 symbols.

Figure 5B:
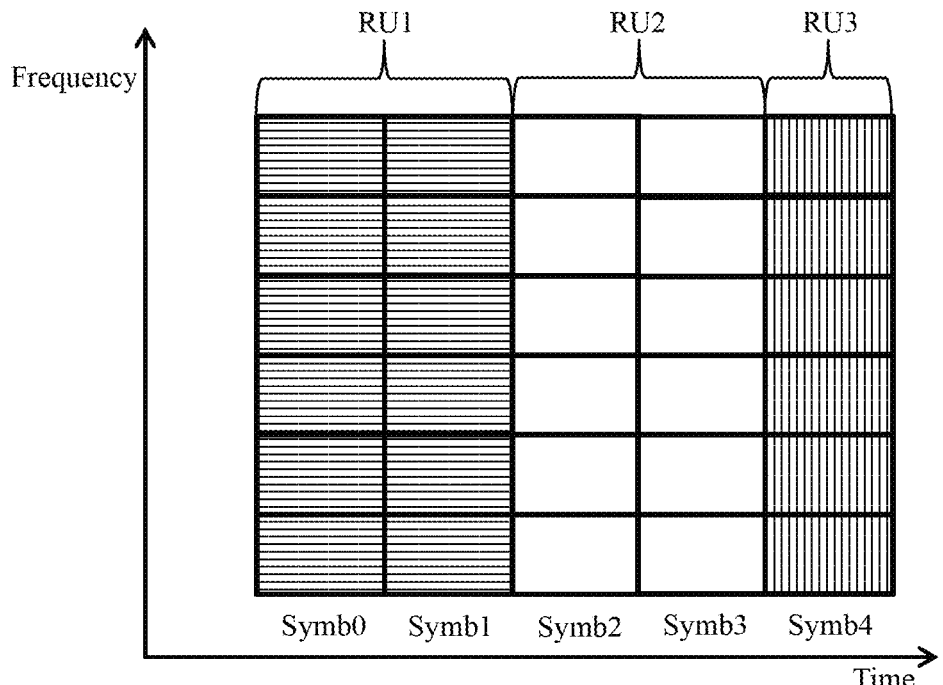
FIG. 5B illustrates an exemplary RU division for a 5-symbol CORESET according to another embodiment of the present disclosure.

In another embodiment of the present disclosure, RU(s) with the configured RU size can be determined consecutively from the first symbol in the CORESET until the left number of symbols is less than or equal to the configured RU size. The last RU in the CORESET is determined to have a size equal to the left number of symbols. That is, all but the last RU in the CORESET have a size equal to the configured RU size, and the last RU has a size less than or equal to the configured RU size. FIG. 5B illustrates an exemplary RU division for a 5-symbol CORESET according to the embodiment. In this example, the RU size is configured to be 2 symbols in the time domain. First, RU1 with a size of 2 symbols is determined to consist of Symb0 and Symb1. After RU1 is determined, the left number of symbols in the CORESET equals 4, which is larger than the configured RU size, so RU2 with a size of 2 symbols is determined to consist of Symb2 and Symb3. After RU2 is determined, the left number of symbols in the CORESET equals 1, which is less than the configured RU size. Thus, the left symbol (Symb4) is determined to be RU3, which has a size of 1 symbol.

According to some embodiments of the present disclosure, for each CORESET time duration, a respective pattern of RU(s) may be predefined in specifications. Once the time duration of a CORESET is configured (e.g., by the parameter 'duration' with a maximum value extended from 3 to a larger number), the pattern of RU(s) in the CORESET can be determined based on the configured time duration. For example, for a 4-symbol CORESET, the predefined pattern may be '2+2'; for a 5-symbol CORESET, the predefined pattern may be '3+2'; and for a 6-symbol CORESET, the predefined pattern may be '3+3.'

As described above, the configuration of a CORESET may include the configuration of the division of RU(s) in the CORESET. According to some embodiments of the present disclosure, the configuration of the CORESET may further include the configuration of REG bundle size for the CORESET.

In an embodiment of the present disclosure, for a CORESET with multiple RUs, a CCE-to-REG mapping may be performed in the whole CORESET based at least on a total number of REGs in the CORESET in a manner as legacy. In this way, REG bundles constituting a CCE may distribute in all the RUs. To implement this, the BS should configure a REG bundle size that can be applied to each of the RUs. That is, the configured REG bundle size is a common REG bundle size to all the RUs. The common REG bundle size can be selected from an intersection of REG bundle size candidates of all the RUs. For example, for interleaved CCE-to-REG mapping, REG bundle size candidates for each size of RU can be: $L \in \{2,6\}$ for size=1, $L \in \{size, 6\}$ for size $\in \{2,3\}$, and $L \in \{6\}$ for size=6. When the CORESET is divided into a first RU with a size of 3 symbols and a second RU with a size of 2 symbols, the configured REG bundle size can only be $6=\{2,6\} \cap \{3,6\}$. When the CORESET is divided into two RUs both with a size of 3 symbols, the configured REG bundle size can be selected from $\{3,6\}=\{3, 6\} \cap \{3,6\}$. The CCE-to-REG mapping may be performed in the whole CORESET based at least on the configured REG bundle size and the total number of REGs in the CORESET.

Figure 6:
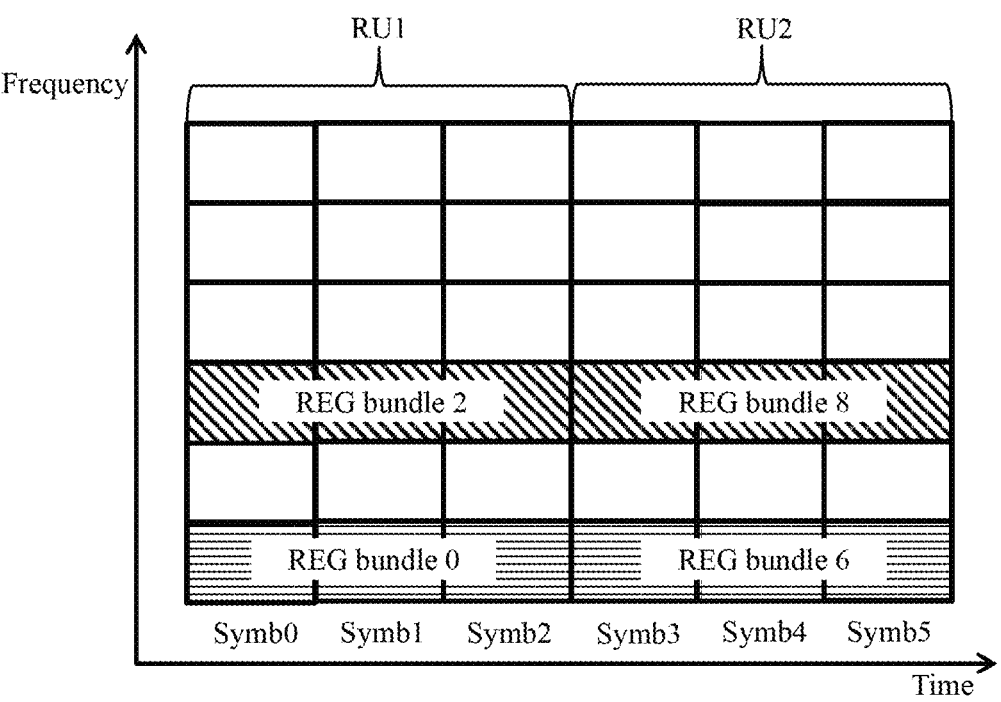
FIG. 6 illustrates an exemplary interleaved CCE-to-REG mapping for a 6-symbol CORESET according to some embodiments of the present disclosure.

FIG. 6 illustrates an exemplary interleaved CCE-to-REG mapping for a 6-symbol (Symb0~Symb5) CORESET according to some embodiments of the present disclosure. In this example, the CORESET is divided into two RUs (RU1 and RU2) both with a size of 3 symbols, and the REG bundle size is configured to be 3 symbols in the time domain. For purpose of simplicity, FIG. 6 only illustrates REG bundles constituting two CCEs. For example, CCE 1 may consist of REG bundle 0 in RU1 and REG bundle 6 in RU2, and CCE 2 may consist of REG bundle 2 in RU1 and REG bundle 8 in RU2.

According to some embodiments of the present disclosure, REGs within the RUs in a CORESET can be numbered consecutively. For example, the smallest REG index in the second RU may equal the largest REG index in the first RU plus 1.

In another embodiment of the present disclosure, for a CORESET with multiple RUs, a CCE-to-REG mapping may be performed in each RU based at least on a configured REG bundle size for each RU and a total number of REGs in each RU. In this way, REG bundles constituting a CCE may distribute in one of the RUs. Each of the REG bundle size L, interleaver size R, and $n_{shift}$ can be configured separately for each RU and can be configured with different values among the RUs. That is, for a first RU in the CORESET, a first REG bundle size can be configured, and a first CCE-to-REG mapping can be performed within the first RU based at least on the first REG bundle size and a first total number of REGs in the first RU; for a second RU in the CORESET, a second REG bundle size can be configured, and a second CCE-to-REG mapping can be performed within the second RU based at least on the second REG bundle size and a second total number of REGs in the second RU, wherein the first REG bundle size can be different from the second REG bundle size, and the first CCE-to-REG mapping can be different from the second CCE-to-REG mapping. Additionally or alternatively, a first interleaver size and a second interleaver size, which can be different, can be configured for the first RU and the second RU, respectively.

Figure 7:
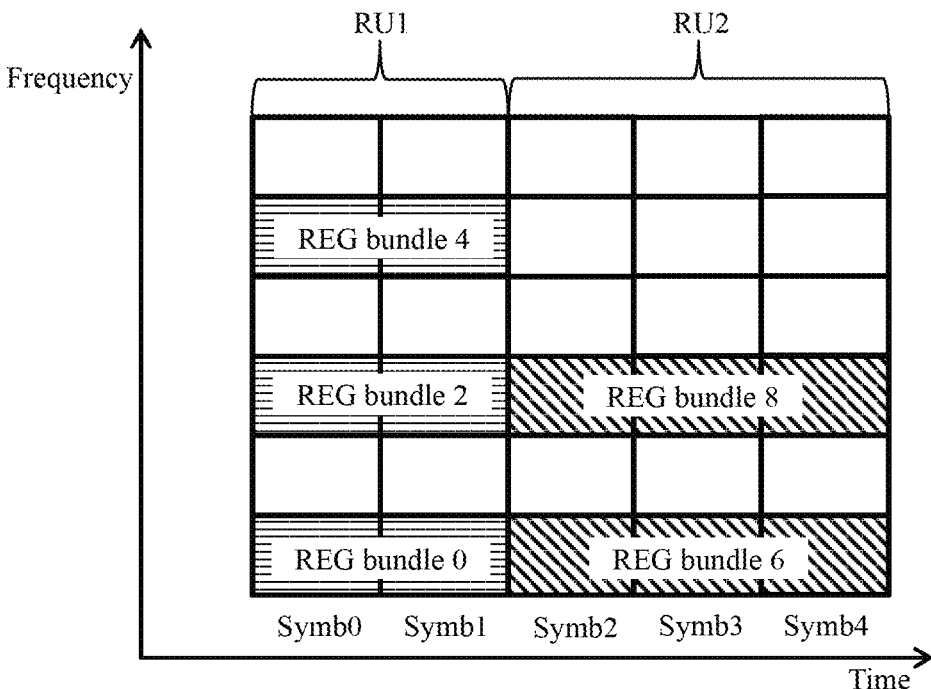
FIG. 7 illustrates an exemplary interleaved CCE-to-REG mapping for a 5-symbol CORESET according to some embodiments of the present disclosure.

FIG. 7 illustrates an exemplary interleaved CCE-to-REG mapping for a 5-symbol (Symb0~Symb4) CORESET according to some embodiments of the present disclosure. In this example, the CORESET is divided into two RUs (RU1 and RU2), wherein RU1 has a size of 2 symbols and RU2 has a size of 3 symbols. The REG bundle size for RU1 is configured to be 2 symbols in the time domain, while the REG bundle size for RU2 is configured to be 3 symbols in the time domain. For purpose of simplicity, FIG. 7 only illustrates REG bundles constituting two CCEs. For example, CCE 1 may consist of REG bundle 0, REG bundle 2, and REG bundle 4 in RU1, and CCE 2 may consist of REG bundle 6 and REG bundle 8 in RU2.

According to some embodiments of the present disclosure, REGs within the RUs in a CORESET can be numbered consecutively. For example, the smallest REG index in the second RU may equal the largest REG index in the first RU plus 1. As an example, the REGs in the CORESET shown in FIG. 7 are numbered consecutively. According to some other embodiments of the present disclosure, REGs within the RUs in a CORESET can be numbered separately. For example, the smallest REG index in each RU starts with 0. Also taking the CORESET shown in FIG. 7 as an example, when the REGs are numbered separately, REG bundle 6 and REG bundle 8 in RU2 may change to be numbered as REG bundle 0 and REG bundle 2, respectively. In either case, CCEs in the RUs should be numbered consecutively. For example, in a CORESET with 2 RUs, the CCEs in the first RU are numbered from 0 to $$N_{REG}^{CORESET\ RU1}/6 - 1, \text{ where } N_{REG}^{CORESET\ RU1}$$

represents the total number of REGs in the first RU, and the CCEs in the second RU are numbered from $$N_{REG}^{CORESET\ RU1}/6 \text{ to } N_{REG}^{CORESET}/6 - 1.$$

In the cases that REGs within the RUs in a CORESET are numbered consecutively, the interleaver within RU i may be defined by:

$$f(x) = (rC + c + n_{shift\,i})\mathrm{mod}\left(N_{REG}^{CORESET\,RU\,i}/L_i\right) + M$$

$$x = cR_i + r + M$$

$$r = 0, 1, \dots , R_i - 1$$

$$c = 0, 1, \dots , C - 1$$

$$C = N_{REG}^{CORESET\,RU\,i}/(L_iR_i)$$

$$M = \sum_{i=0}^{i-1} N_{REG}^{CORESET\,RU\,i}/L_i$$

where $$N_{REG}^{CORESET\,RU\,i}$$

is the total number of REGs in RU i, $L_i$ is the REG bundle size configured for RU i, $R_i$ is the interleaver size configured for RU i, and $n_{shift}$ is the shift value configured for RU i.

In the cases that REGs within the RUs in a CORESET are numbered separately, the interleaver within RU i may be defined by:

$$f(x) = (rC + c + n_{shift\,i})\mathrm{mod}\left(N_{REG}^{CORESET\,RU\,i}/L_i\right)$$

$$x = cR_i + r + M$$

$$r = 0, 1, \dots , R_i - 1$$

$$c = 0, 1, \dots , C - 1$$

$$C = N_{REG}^{CORESET\,RU\,i}/(L_iR_i)$$

$$M = \sum_{i=0}^{i-1} N_{REG}^{CORESET\,RU\,i}/L_i$$

Figure 8:
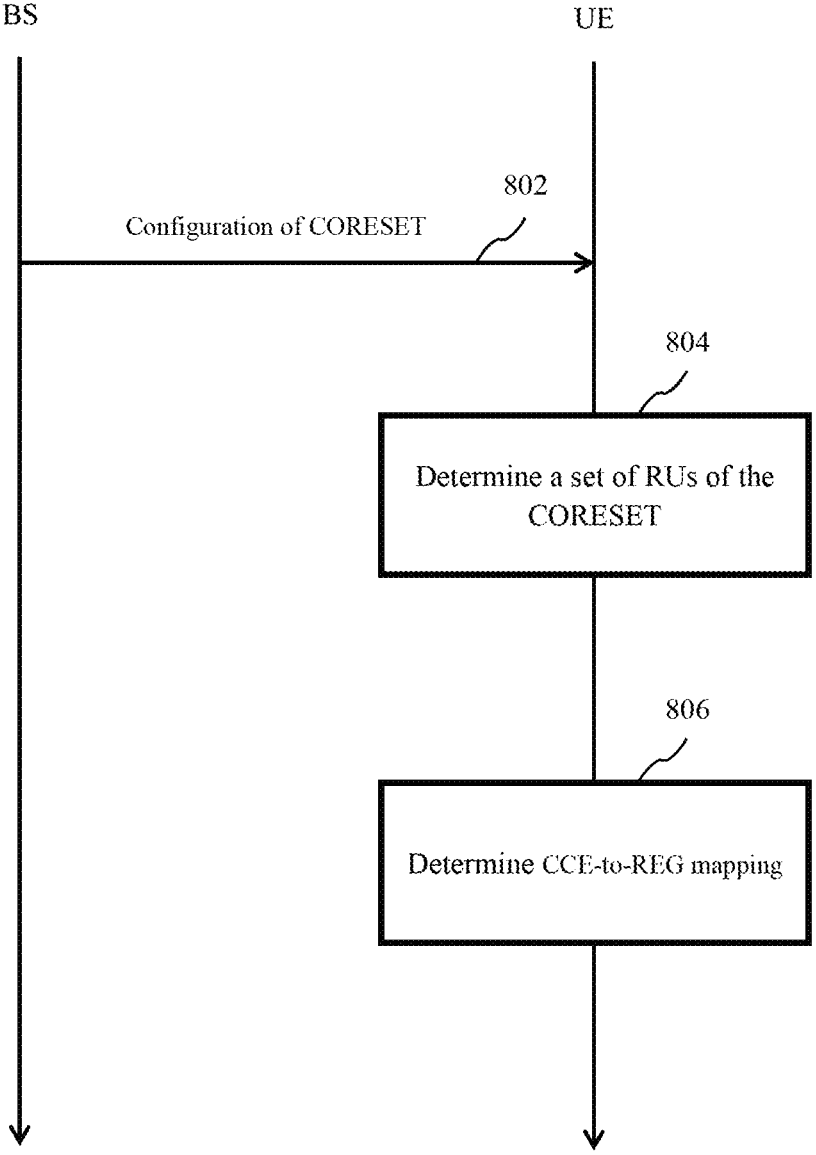
FIG. 8 illustrates a flow chart of an exemplary method for configuring and determining RU division in a CORESET according to some embodiments of the present disclosure.

FIG. 8 illustrates a flow chart of an exemplary method for configuring and determining RU division in a CORESET according to some embodiments of the present disclosure.

As shown in FIG. 8, a BS (e.g., the BS 101 in FIG. 1) may transmit a configuration of a CORESET to a UE (e.g., the UE 103 in FIG. 1) at step 802. According to some embodiments of the present disclosure, the CORESET may include a set of RUs. The configuration of the CORESET may indicate at least one of a time duration of the CORESET, a pattern of the set of RUs, or an RU size. After receiving the configuration of the CORESET, the UE may determine the set of RUs of the CORESET based at least in part on the at least one of the time duration, the pattern, or the RU size, at step 804.

In an embodiment of the present disclosure, the configuration of the CORESET may include the pattern of the set of RUs when the time duration of the CORESET is larger than 3 symbols, and the pattern is selected from a predefined pattern set.

In an embodiment of the present disclosure, the configuration of the CORESET may include the time duration of the CORESET, which equals a sum of symbols of the set of RUs based on the pattern of the set of RUs. In another embodiment of the present disclosure, the configuration may implicitly indicate the time duration, which can be determined by a sum of symbols of the set of RUs based on the pattern. Additionally, the configuration may include a duration equal to a size of a first RU in the set of RUs.

In an embodiment of the present disclosure, the configuration of the CORESET may include a parameter, and a value of the parameter indicates both the time duration of the CORESET and the pattern of the set of RUs.

In an embodiment of the present disclosure, the configuration of the CORESET may include a size of each RU in the set of RUs.

In an embodiment of the present disclosure, the configuration of the CORESET may include the time duration of the CORESET and the RU size, and determining the set of RUs may include determining the pattern of the set of RUs based on the time duration and the RU size. For example, determining the pattern of the set of RUs based on the time duration and the RU size may include determining that all but a last RU of the set of RUs have a size equal to the RU size, and the last RU has a size less than or equal to 3 symbols in time domain.

In an embodiment of the present disclosure, the configuration of the CORESET may include the time duration of the CORESET, and determining the set of RUs may include determining the pattern of the set of RUs based on the time duration.

In an embodiment of the present disclosure, the configuration of the CORESET may further include an REG bundle size for each RU of the set of RUs. The REG bundle size for each RU can be a common REG bundle size selected from an intersection of REG bundle size candidates of all the set of RUs. The UE may determine a CCE-to-REG mapping defined in the whole CORESET based at least on the common REG bundle size and a total number of REGs in the CORESET, at step 806. Alternatively, a first REG bundle size can be indicated for a first RU of the set of RUs, and a second REG bundle size can be indicated for a second RU of the set of RUs. The UE may determine a first CCE-to-REG mapping defined within the first RU based at least on the first REG bundle size and a first total number of REGs in the first RU, and determine a second CCE-to-REG mapping defined within the second RU based at least on the second REG bundle size and a second total number of REGs in the second RU, at step 806. In an embodiment of the present disclosure, the configuration may further indicate a first interleaver size for the first RU and a second interleaver size for the second RU.

Figure 9:
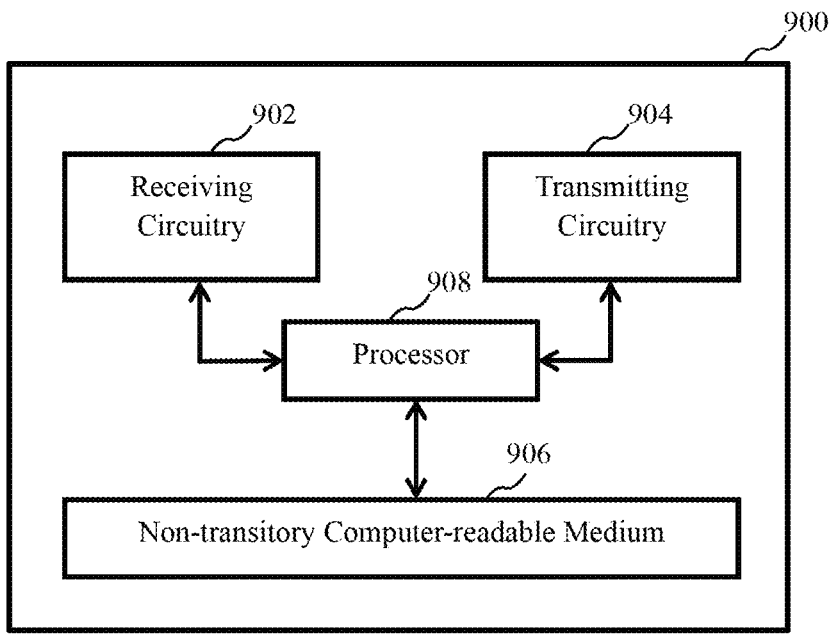
FIG. 9 illustrates an exemplary block diagram of an apparatus according to some embodiments of the present disclosure.

FIG. 9 illustrates an exemplary block diagram of an apparatus 900 according to some embodiments of the present disclosure. In some embodiments of the present disclosure, the apparatus 900 may be or include a BS (e.g., the BS 101) or other devices having similar functionality. In some embodiments, the apparatus 900 can be configured to perform the method illustrated in FIG. 8.

As shown in FIG. 9, the apparatus 900 may include at least one receiving circuitry 902, at least one transmitting circuitry 904, at least one non-transitory computer-readable medium 906, and at least one processor 908 coupled to the at least one receiving circuitry 902 the at least one transmitting circuitry 904, the at least one non-transitory computer-readable medium 906. While shown to be coupled to each other via the at least one processor 908 in the example of FIG. 9, the at least one receiving circuitry 902, the at least one transmitting circuitry 904, the at least one non-transitory computer-readable medium 906, and the at least one processor 908 may be coupled to one another in various arrangements. For example, the at least one receiving circuitry 902, the at least one transmitting circuitry 904, the at least one non-transitory computer-readable medium 906, and the at least one processor 908 may be coupled to each other via one or more local buses (not shown for simplicity).

Although in FIG. 9, elements such as receiving circuitry 902, transmitting circuitry 904, non-transitory computer-readable medium 906, and processor 908 are described in the singular, the plural is contemplated unless limitation to the singular is explicitly stated. In some embodiments of the present disclosure, the at least one receiving circuitry 902 and the at least one transmitting circuitry 904 may be combined into a single device, such as a transceiver. In certain embodiments of the present disclosure, the apparatus 900 may further include a memory and/or other components.

In some embodiments of the present disclosure, the at least one non-transitory computer-readable medium 906 may have stored thereon computer-executable instructions which are programmed to cause the at least one processor 908 to implement the steps of the methods according to embodiments of the present disclosure, for example as described in view of FIG. 8, with the at least one receiving circuitry 902 and the at least one transmitting circuitry 904. For example, when executed, the instructions may cause the at least one processor 908 to transmit, with the at least one transmitting circuitry 904, a configuration of a CORESET, wherein the CORESET may include a set of RUs, and the configuration may indicate at least one of a time duration of the CORESET, a pattern of the set of RUs, or an RU size.

Figure 10:
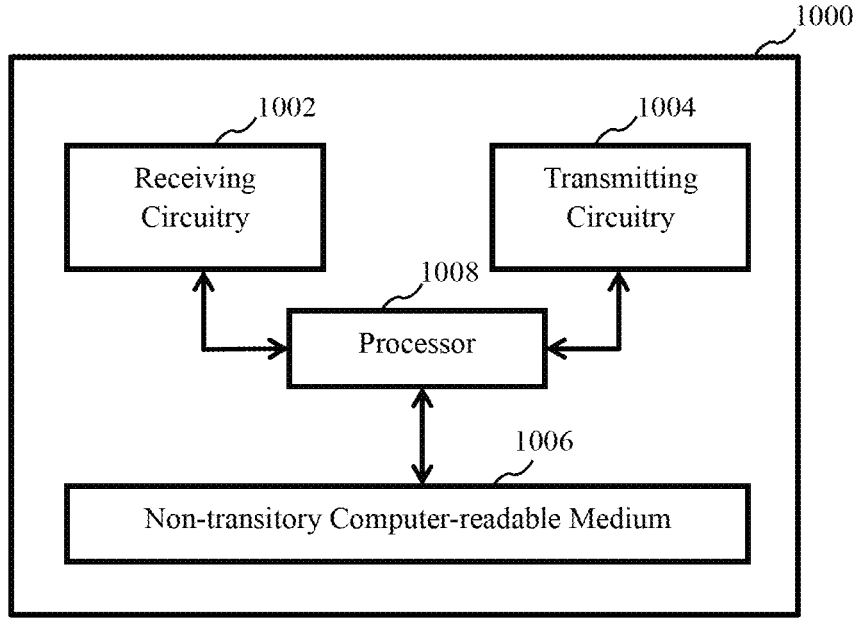
FIG. 10 illustrates an exemplary block diagram of another apparatus according to some embodiments of the present disclosure.

FIG. 10 illustrates an exemplary block diagram of an apparatus 1000 according to some embodiments of the present disclosure. In some embodiments of the present disclosure, the apparatus 1000 may be or include a UE (e.g., the UE 103) or other devices having similar functionality. In some embodiments, the apparatus 1000 can be configured to perform the method illustrated in FIG. 8.

As shown in FIG. 10, the apparatus 1000 may include at least one receiving circuitry 1002, at least one transmitting circuitry 1004, at least one non-transitory computer-readable medium 1006, and at least one processor 1008 coupled to the at least one receiving circuitry 1002, the at least one transmitting circuitry 1004, the at least one non-transitory computer-readable medium 1006. While shown to be coupled to each other via the at least one processor 1008 in the example of FIG. 10, the at least one receiving circuitry 1002, the at least one transmitting circuitry 1004, the at least one non-transitory computer-readable medium 1006, and the at least one processor 1008 may be coupled to one another in various arrangements. For example, the at least one receiving circuitry 1002, the at least one transmitting circuitry 1004, the at least one non-transitory computer-readable medium 1006, and the at least one processor 1008 may be coupled to each other via one or more local buses (not shown for simplicity).

Although in FIG. 10, elements such as receiving circuitry 1002, transmitting circuitry 1004, non-transitory computer-readable medium 1006, and processor 1008 are described in the singular, the plural is contemplated unless limitation to the singular is explicitly stated. In some embodiments of the present disclosure, the at least one receiving circuitry 1002 and the at least one transmitting circuitry 1004 may be combined into a single device, such as a transceiver. In certain embodiments of the present disclosure, the apparatus 1000 may further include an input device, a memory, and/or other components.

In some embodiments of the present disclosure, the at least one non-transitory computer-readable medium 1006 may have stored thereon computer-executable instructions which are programmed to cause the at least one processor

1008 to implement the steps of the methods according to embodiments of the present disclosure, for example as described in view of FIG. 8, with the at least one receiving circuitry 1002 and the at least one transmitting circuitry 1004. For example, when executed, the instructions may cause the at least one processor 1008 to receive, with the at least one receiving circuitry 1002, a configuration of a CORESET, wherein the CORESET may include a set of RUs, and the configuration may indicate at least one of a time duration of the CORESET, a pattern of the set of RUs, or an RU size. The instructions may further cause the at least one processor 1008 to determine the set of RUs of the CORESET based at least in part on the at least one of the time duration, the pattern, or the RU size.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electro-magnetic, infrared, holographic, micromechanical, or semi-conductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. An apparatus for wireless communication, comprising:
at least one memory; and
at least one processor coupled with the at least one memory and configured to cause the apparatus to:
receive a configuration of a control resource set (CORESET),
wherein the CORESET comprises a set of resource units (RUs),
wherein the configuration indicates a time duration of the CORESET and a pattern of the set of RUs, and
wherein the configuration comprises the pattern of the set of RUs when the time duration of the CORESET is larger than 3 symbols and equals a sum of symbols of the set of RUs based on the pattern, and the pattern is selected from a predefined pattern set; and
determine the set of RUs of the CORESET based at least in part on the time duration and the pattern.

2. The apparatus of claim 1, wherein the configuration implicitly indicates the time duration, which is determined by a sum of symbols of the set of RUs based on the pattern.

3. The apparatus of claim 2, wherein the configuration comprises a duration equal to a size of a first RU in the set of RUs.

4. The apparatus of claim 1, wherein the configuration comprises a parameter, and a value of the parameter indicates both the time duration and the pattern.

5. The apparatus of claim 1, wherein the configuration comprises a size of each RU in the set of RUs.

6. The apparatus of claim 1, wherein the configuration comprises an RU size, and wherein the at least one processor is configured to cause the apparatus to determine the set of RUs by determining the pattern of the set of RUs based on the time duration and the RU size.

7. The apparatus of claim 6, wherein the at least one processor is configured to cause the apparatus to determine the pattern of the set of RUs based on the time duration and the RU size by determining that all but a last RU of the set of RUs have a size equal to the RU size, and the last RU has a size less than or equal to 3 symbols in a time domain.

8. The apparatus of claim 1, wherein the at least one processor is configured to cause the apparatus to determine the set of RUs by determining the pattern of the set of RUs based on the time duration.

9. The apparatus of claim 1, wherein the configuration further indicates a resource element group (REG) bundle size for each RU of the set of RUs.

10. The apparatus of claim 9, wherein the REG bundle size for each RU is a common REG bundle size selected from an intersection of REG bundle size candidates of all the set of RUs.

11. The apparatus of claim 10, wherein the at least one processor is configured to cause the apparatus to: determine a control-channel element (CCE)-to-REG mapping defined in the whole CORESET based at least on the common REG bundle size and a total number of REGs in the CORESET.

12. The apparatus of claim 9, wherein a first REG bundle size is indicated for a first RU of the set of RUs, and a second REG bundle size is indicated for a second RU of the set of RUs.

13. A method performed by an apparatus, the method comprising:
receiving a configuration of a control resource set (CORESET),
wherein the CORESET comprises a set of resource units (RUs),
wherein the configuration indicates a time duration of the CORESET and a pattern of the set of RUs, and
wherein the configuration comprises the pattern of the set of RUs when the time duration of the CORESET is larger than 3 symbols and equals a sum of symbols of the set of RUs based on the pattern, and the pattern is selected from a predefined pattern set; and
determining the set of RUs of the CORESET based at least in part on the time duration and the pattern.

14. The method of claim 13, wherein the configuration comprises a parameter, and a value of the parameter indicates both the time duration and the pattern.

15. The method of claim 13, wherein the configuration comprises a size of each RU in the set of RUs.

16. The method of claim 13, wherein the configuration comprises an RU size, and determining the set of RUs comprises determining the pattern of the set of RUs based on the time duration and the RU size.

17. The method of claim 13, wherein the configuration further indicates a resource element group (REG) bundle size for each RU of the set of RUs.

18. The method of claim 17, wherein the REG bundle size for each RU is a common REG bundle size selected from an intersection of REG bundle size candidates of all the set of RUs.

19. The method of claim 17, wherein a first REG bundle size is indicated for a first RU of the set of RUs, and a second REG bundle size is indicated for a second RU of the set of RUs.

20. An apparatus for wireless communication, comprising:
at least one memory; and at least one processor coupled with the at least one
memory and configured to cause the apparatus to:
receive a configuration of a control resource set
(CORESET),
wherein the CORESET comprises a set of resource
units (RUs),
wherein the configuration indicates a time duration
of the CORESET, a pattern of the set of RUs, or
an RU size, and
wherein the configuration comprises the pattern of
the set of RUs when the time duration of the
CORESET is larger than 3 symbols, and the
pattern is selected from a predefined pattern set;
and
determine the set of RUs of the CORESET by deter-
mining the pattern of the set of RUs based on the
time duration.

* * * * *